Feb. 28, 1956
A. C. C. HANSEN
2,736,561
HOLDERS FOR ROTARY TOOLS
Filed Nov. 21, 1951
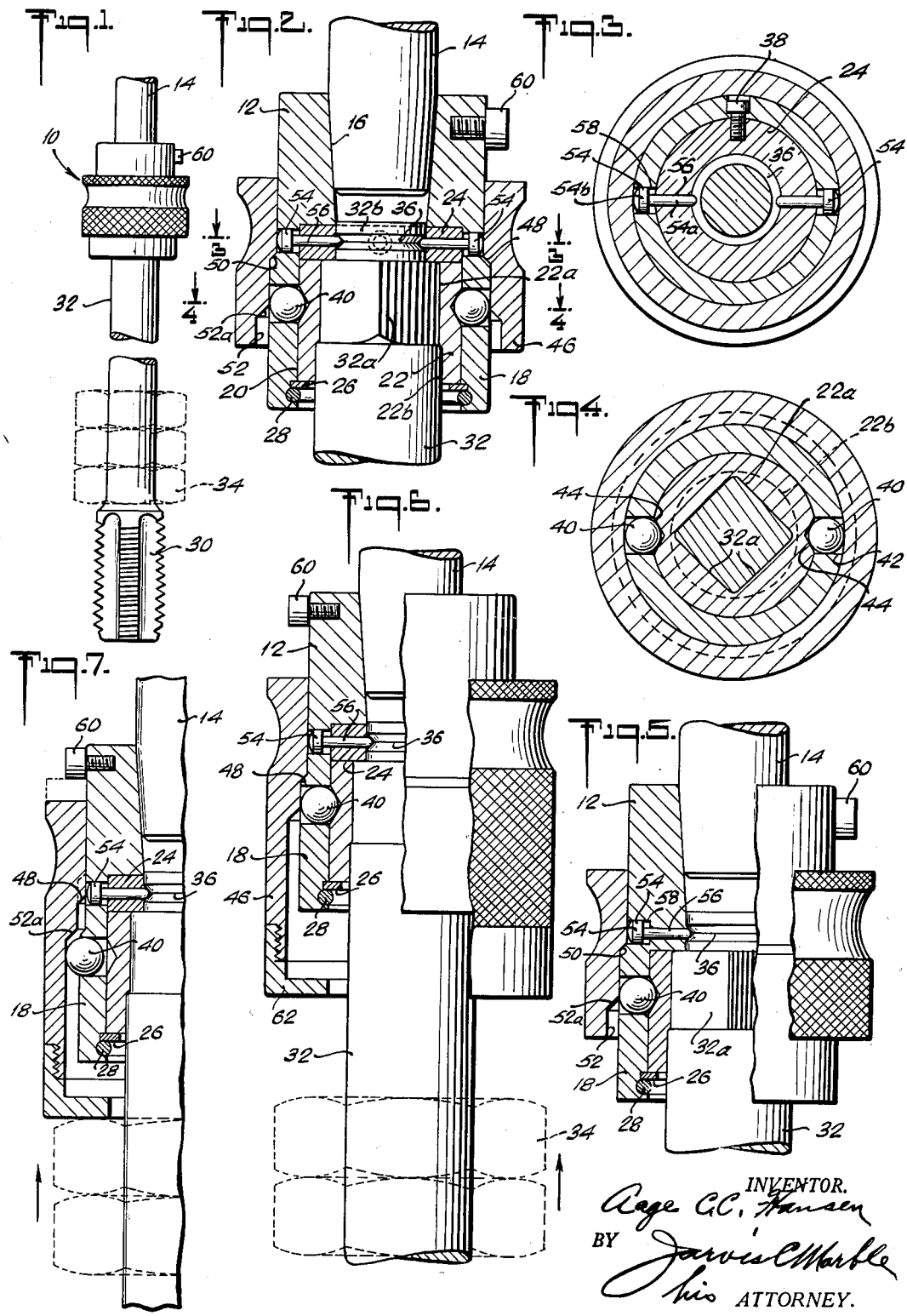
INVENTOR.
Aage C.C. Hansen
BY Jarvis C. Marble
his ATTORNEY.

United States Patent Office 2,736,561
Patented Feb. 28, 1956

2,736,561

HOLDERS FOR ROTARY TOOLS

Aage C. C. Hansen, Nixon, N. J., assignor to Elastic Stop Nut Corporation of America, Union Township, N. J., a corporation of New Jersey Application November 21, 1951, Serial No. 257,603

17 Claims. (Cl. 279—75)

The present invention relates to tool holders for rotary tools and has particular reference to holders for tools such as taps, drills, reamers and the like which require removal from time to time from a power operated machine tool for replacement or other reasons.

The invention is particularly useful in connection with power tapping machines, especially of the multiple spindle type, in which long shanked taps are used to successively tap a series of articles such as nuts which after tapping are collected on the shank of the tap until the latter is filled, after which the tap is removed from its holder, the tapped articles removed from the shank and the tap reinstalled in its holder for further operation. In such machines, and others of like nature, when it is necessary to remove and replace tools, the removal and replacement must be effected when power is not being transmitted to the tool if danger and probable injury to the operator are to be avoided.

The machine can of course be shut down while a tool is changed. This procedure however is undesirable from a production standpoint, even with a single spindle machine, and in the case of machines such as multiple spindle tapping machines, it is highly inefficient unless special means are provided for disconnecting individual spindles from the source of power.

While certain forms of quick releasing chucks for holding rotary tools have been developed, such devices, so far as I am aware, require release of the tool while power is applied to it, the only difference between such devices and conventional forms of chucks being the time element, and also such chucks being subject to the inherent potential danger to the operator of attempting to remove or set in place a rotary tool under conditions such that the normal operating torque is being applied to the tool.

It is accordingly the principal object of the present invention to provide a new and improved form of quick releasable tool holder or chuck for rotary tools which will enable rotary tools of the kind under discussion to be quickly and easily removed from and replaced in the holder without interruption of power transmission to the holder from the machine tool and without transmission of power to the tool during the removal or reinstalling of the tool.

The manner in which the above stated general object and other and more detailed objects hereinafter appearing, are attained, and the advantages to be derived from use of the invention, may best be understood from a consideration of the ensuing portion of this specification, taken in conjunction with the accompanying drawings, which disclose by way of example but without limitation, suitable examples of apparatus for carrying the invention into effect.

In the accompanying drawings:

Fig. 1 is a view showing in elevation an assembly of power spindle and tool employing a tool holder embodying the invention;

Fig. 2 is a longitudinal section on an enlarged scale of the holder shown in Fig. 1;

Fig. 3 is a transverse section taken on the line 3—3 of Fig. 2;

Fig. 4 is a transverse section taken on the line 4—4 of Fig. 2;

Fig. 5 is a fragmentary section similar to Fig. 2 and showing a slightly different form of tool holder;

Fig. 6 is a view similar to Fig. 5 showing still another form of holder; and

Fig. 7 is a fragmentary view showing the parts illustrated in Fig. 6 in a different position.

Referring now more particularly to Figs. 1 to 4 the tool holder or chuck indicated generally at 10 comprises a body 12 adapted to be attached to and rotated by the spindle or a like power element 14 of a machine tool. In the example shown, the spindle 14 is provided with a tapered end received in a suitable complementary tapered recess 16 in the body 12. It will be understood however that so far as the connection between the body 12 and the power transmitting element 14 is concerned, any of the conventional kinds of connection may be used, as for example the reverse of the connection illustrated, in which the body 12 of a tool holder is provided with a tapered shank received in a socket in the spindle of the power tool.

The body 12 is formed with a depending annular wall or skirt 18 providing an axially extending recess defined in part by an internal cylindrical bearing surface 20 for laterally supporting the annular tool engaging member 22 rotatably within the recess.

At the base of the recess there is located in the present embodiment an annular pilot ring 24 the nature and function of which will later be described, and the tool engaging member 22 is axially retained in the recess between the pilot ring 24 and a removable retaining ring 26 locked in place by the snap ring 28. The member 22 is shown as engaging in driving relation a long shanked tap 30 of known general form having the usual elongated cylindrical shank portion 32 adapted to accumulate a series of tapped nuts (indicated in dotted lines in Fig. 1 at 34), and from which the nuts are periodically removed after removing the tap from the holder.

Above the cylindrical portion of the shank 32 a section of the shank is square to provide for driving faces 32a and above the driving faces there is provided a cylindrical pilot portion 32b of smaller diameter. In this latter portion a circumferential groove 36 is provided, which advantageously but not necessarily is of V-shaped cross section as shown.

At its inner end the member 22 is provided with flat internal tool engaging surfaces 22a for engagement in driving relation with the surfaces 32a on the shank of the tap, and outwardly of the surfaces 22a, the member 22 is advantageously provided with an internal bore 22b for engaging the upper end of the cylindrical portion of the shank 32.

The pilot portion 32b of the shank of the tool engages the internal bore of the pilot ring 24, the latter being held against rotation within the body 12 by any suitable means such as the set screw 38. With this arrangement the tool is accurately centered in the holder by means of the cylindrical bearing surfaces and the surfaces 22a and 32a therefore need be relied upon only for transmitting torque to the tool. This arrangement contributes advantageously to proper alignment of the tool initially and maintenance of the proper alignment, even with old tools, since the cylindrical aligning surfaces are not subjected to appreciable wear, while the driving surfaces may readily become sufficiently worn or otherwise damaged in use to create play or other defects which would result in misalignment if the driving surfaces were relied upon for aligning purposes.

With the construction shown it will be apparent that the distance across the driving faces or flats 22a and 32a will have to be at least as great as the diameter of the bore in the pilot ring 24. Otherwise the pilot portion 32b of the tool could not be inserted past the flats 22a into the bore in the pilot ring. Likewise the distance between diagonal corners defined by the flats must be less than the diameter of the bore 22b in member 22 to enable the flats 32a to be inserted past bore 22b into driving engagement with flats 22a.

For transmitting driving torque from the body 12 of the holder to the tool, releasable driving detents are employed which in the embodiment illustrated are in the form of balls 40 located in bores 42 extending through the wall of the skirt 18 at diametrically opposite places. While two such balls have been shown, it will be evident that a different number may be employed. The diameter of the balls 40 is greater than the thickness of the skirt 18, and the tool engaging member 22 is provided with recesses 44 for receiving the projecting portions of the balls when the latter are positioned so that they do not project radially beyond the skirt 18.

The position of the balls 40 is controlled by means of a control member 46 in the form of a ring or sleeve rotatably journalled on the body 12 so as to be freely rotatable and axially slidable thereon. The sleeve may advantageously, as shown, be knurled and grooved on its external surface to facilitate its being grasped and manipulated by the machine operator.

The sleeve 46 has an internal differential bore providing a shoulder 48 for engaging a similar shoulder 50 formed on the body 12, the external diameter of the upper portion of which is slightly less than the external diameter of the lower or skirt portion 18. Shoulders 48 and 50 provide contacting abutments for limiting the lower axial position of the sleeve 46 and as will be observed from Fig. 2 the lower end portion of the sleeve is internally recessed by a counterbore 52. The upper end of the recess provided by the counterbore is advantageously conical as shown and the axial extent or depth of the recess is such that when the sleeve 46 is in its lowermost position as shown in Fig. 2, the inner wall of the sleeve above the recess acts to hold the balls 40 radially inwardly in locking position, in which portions of the balls are seated in the recesses 44 in the tool engaging member 22 to prevent relative turning movement between the body 12 and the member 22.

With the parts in the position shown in Fig. 2, it will be evident that the driving torque from the power spindle 14 will be transmitted through the body 12, the detent balls 40, member 22 and the flat driving faces 22a and 32a to the tap 30.

It will also be apparent that if the sleeve 46 is lifted to a position where the recess formed by the counterbore 52 is opposite the balls 40, the latter will be free to move radially outwardly so as to no longer engage the member 22 and thus break the driving connection to the tool, since the tool engaging member 22 is free to rotate freely within the body 12 under such conditions.

Manipulation of the sleeve while the power spindle and the body 12 are rotating involves no danger to the operator since the sleeve is freely rotatable on the body 12 and is sufficiently small and light so that its inertia presents no problem in stopping the rotation of the sleeve when it is grasped by the operator. Since the sleeve is not subject to severe stresses it may if desired be made of lightweight metal to keep inertia forces at a low value.

In addition to having a releasable torque transmitting connection between the driving spindle and the tool, it is also necessary to have a releasable connection for holding the tool against axial displacement from the holder and in accordance with the present arrangement the releasable axial connection between the tool and the holder is provided by means of detents 54 in the form of headed pins the shank portions 54a of which extend through radial bores 56 in the pilot ring 24 and the head portions 54b of which are located in radial bores 58 in the body 12 positioned to register with the bores 56 in the pilot ring.

The length of the detent pins 54 is such that when the sleeve 46 is in its lowermost position as shown in Fig. 2 and the heads of the pins are retained in the bores 58 by sleeve 46, the inner ends of the pins engage in the groove 36 in the pilot portion 32b of the shank of the tap, and with these detents in engagement in the groove it will be evident that the tap will be held against axial displacement from the holder. It will also be evident that when the sleeve is lifted so that the shoulder 48 passes the bores 58 the detent pins will be free to move outwardly to release the tool and permit it to be removed from the holder.

An important feature of the construction is the relation of the location of the internal shoulder 48 on sleeve 46 and of the inner end of the recess formed by the counterbore 52, which in the present embodiment is provided by the conical shoulder 52a, to the bores 42 and 58 in the body 12. This relation should be such, as shown, that when the sleeve 46 is lifted from its lowermost position the detent balls 40 are released to break the driving connection between the power spindle and the tool, while the pin detents 54 are still held in engagement with the tool to retain it axially in the holder. Axial release of the tool from the holder is then effected, after the driving connection has been broken, by further upward movement of the sleeve. With this arrangement the tool can be removed from the holder with perfect safety even though power operation of the spindle is uninterrupted, since by grasping the freely rotatable sleeve 46 and moving it slightly upwardly the operator first disconnects the tool from driving relation with the spindle. This break in the driving relation is effected while the tool is still mechanically held in the holder, and after the driving relation has been broken the operator may then safely grasp the tool and remove it from the holder upon further upward movement of the sleeve 46 to release the retaining detents 54.

Likewise, replacement of the tool in the holder can be effected with perfect safety even though power is continuously applied to the spindle 14. To replace a tool the sleeve 46 is first lifted to its uppermost position, which in the present construction is limited by the set screw 60. This releases both the ball detents 40 and the pin detents 54 which, due to centrifugal force acting on them because of the rotation of the holder, automatically move radially outwardly to their limit position. The tool is then inserted and the sleeve 46 moved partially downwardly to cause engagement of the retaining detents 54 with the shank of the tool, thus providing vertical support for the latter so that the tool can be released from the grasp of the operator. This may be done before any torque is transmitted to the tool since in the intermediate position of the sleeve with detents 54 engaged the driving detents 40 are still disengaged. Then after the tool has been released from the grasp of the operator, the sleeve can then be moved to its lower limit position to effect driving engagement between the spindle and the tool.

Thus by an extremely simple construction complete safety is achieved in the removal and replacement of tools and it is further to be noted that the arrangement is such as to make it applicable to substantially standard forms of tools. It is readily possible to provide tool engaging members 22 having different internal configurations adapted to different specific forms of shanks. Also different sizes of tools may easily be accommodated in the same holder assembly by changing the internal parts such as the pilot ring 24 and detents 54 as well as the tool engaging member 22, to fit the tools of different size.

While the construction shown in Fig. 2 is desirable it is not necessary to the exercise of the invention and in Fig. 5 there is shown an arrangement like that of Fig. 2, but in which the construction is simplified by omitting the separate pilot ring 24 and locating the retaining detents 54 in bores 56 and 58 both of which are formed directly in the body 12 of the holder.

As previously noted, holders embodying the present invention are particularly useful for use in multiple spindle tapping machines. In the operation of such machines a single operator attends a number of spindles and tool holders embodying the present invention are particularly well adapted to incorporate an automatic driving release enabling an operator to attend a much larger number of spindles than would otherwise be possible.

A holder embodying such an automatic release feature is shown in Figs. 6 and 7. The construction is in substantially all respects the same as shown in Fig. 2 and corresponding parts have been correspondingly numbered. The principal difference in the construction is the extension of the lower end of the control sleeve 46 below the lower end of the skirt 18 of the body 12, and the provision of an annular abutment ring 62 which is threaded on to the lower end of the sleeve 46.

The operation of this embodiment of the holder will be largely self-evident from Figs. 6 and 7, when used with a tap of the accumulating type. As nuts are successively tapped and accumulated on the shank 32 of the tap, the uppermost one of the nuts finally rises to a position where it engages the abutment ring 62 and lifts the sleeve 46 far enough so that the shoulder 52a on the sleeve is positioned as shown in Fig. 7 to release the driving detents 40 and stop rotation of the tap. This automatically stops further rise of the nuts on the shank and, as shown, the distance between the shoulders 52a and 48 is such that with the shoulder 52a lifted to the position shown in Fig. 6, the shoulder 48 is still so positioned as to keep the retaining detents 54 in engagement with the shank of the tool. With this arrangement, the tool thus automatically stops its rotation when the shank is filled with tapped nuts, and remains idle although still retained in the holder, until the operator can reach it and complete the release of the tool from the holder by manually lifting the control sleeve to the uppermost position, indicated in dotted lines in Fig. 7, in which the retaining detents are released.

While for purposes of disclosing the invention, suitable practical examples of apparatus have been described and illustrated, it will readily be apparent that the invention may be embodied in other specific forms of apparatus and that certain features of the invention may be used to the exclusion of others. It is accordingly to be understood that the scope of the invention is not in any way limited to the examples of apparatus herein disclosed but is to be understood as including all forms of apparatus falling within the scope of the appended claims.

What is claimed is:

1. A tool holder for rotary tools comprising a body adapted to be rotated, a tool engaging member rotatably carried by said body for driving a tool, first releasable means for selectively establishing a driving connection between said body and said member, second releasable means for selectively retaining a tool in engagement with said tool engaging member, and common control means movable to selectively engage and release said first and second releasable means while said tool engaging member is carried by said body.

2. A tool holder for rotary tools comprising a body adapted to be rotated, a tool engaging member rotatably carried by said body for driving a tool, first releasable means for selectively establishing a driving connection between said body and said member, second releasable means for selectively retaining a tool in engagement with said tool engaging member, and a common control member carried by said body and freely rotatable thereon, said control member being axially shiftable between a first terminal position in which both of said releasable means are engaged and a second terminal position in which both of said releasable means are released.

3. A tool holder as defined in claim 2 in which said first releasable means and said second releasable means are released in sequence in the order named by movement of said control member from said first terminal position to said second terminal position.

4. A tool holder for rotary tools comprising a body adapted to be rotated, a tool engaging member rotatably mounted within said body, said tool engaging member having internal driving surfaces for engaging and driving a tool inserted within said member, first detent means extending through said body for releasably engaging said member to lock said body and said member in rotatably fixed driving relation, second detent means extending through said body for releasably engaging a tool mounted within said member to retain it against axial displacement from said member, and a sleeve rotatably mounted on said body and axially shiftable thereon, said sleeve having internal surfaces located to engage said first detent means to selectively lock the tool engaging member against rotation within said body and to engage said second detent means to hold a tool within said tool engaging member.

5. A tool holder as defined in claim 4 in which the internal surfaces of the sleeve are axially spaced and located so that said first and said second detent means are released in the order named when the sleeve is moved in one axial direction and said second and said first detent means are engaged in the order named when said sleeve is moved in the opposite axial direction.

6. A tool holder for a rotary tool comprising a body adapted to be rotated and providing a socket, a tool engaging member rotatably mounted in said socket, means for fixing said member axially in said socket, said member having an internal surface for causing rotation therewith of a tool inserted in said member, releasable detent means carried by said body for locking said member rotationally relative to said body, an external control member carried by said body and selectively movable relative thereto to control said detent means, and releasable detent means controlled by said control member for engaging a tool inserted in said tool engaging member to hold the tool against axial displacement therein and to release the tool from said member while the latter is axially fixed in said socket.

7. A tool holder for a rotary tool comprising a body adapted to be rotated and providing a socket, a tool engaging member rotatably mounted and axially fixed in said socket, said member having an internal surface for causing rotation therewith of a tool inserted in said member, first detent means carried by said body and operable from the exterior thereof for locking or releasing said member rotationally with respect to said body, second detent means carried by said body and operable from the exterior thereof for holding or releasing axially a tool inserted in said member, and an external control member carried by said body for operating said detent means to selectively lock or release a tool both rotationally and axially relative to said body.

8. In a tool holder for a rotary tool, a body adapted to be rotated and providing a socket, a hollow tool engaging member rotatably mounted and axially fixed in said socket, the internal surface of said member comprising a cylindrical bore in the axially outer part of said member and non-circular driving surface in the axially inner part of said member for engaging complementary surfaces on a tool, means providing a pilot bore of smaller diameter than said first mentioned bore and coaxial therewith, said pilot bore being located in said body inwardly of said tool engaging member and adapted to engage and radially support the pilot end of a tool extending through said tool engaging member, whereby axial alignment of the tool with said body is determined by said bores and said non-circular surface operates solely to transmit torque from said member to the tool, and releasable means for selectively locking said tool engaging member against rotation relative to said body.

9. A tool holder as defined in claim 8 in which said pilot bore is formed in said body.

10. A tool holder as defined in claim 8 including an annular pilot ring removably located in the bottom of said socket and providing said pilot bore, and means for securing said pilot ring against relative rotation within said body.

11. The combination, with a rotary tool having a shank, of a tool holder comprising a body adapted to be rotated and providing a socket, a tool engaging member rotatably mounted and axially fixed in said socket, said member having an internal surface for causing rotation therewith of said tool inserted in said member, first detent means carried by said body and operable from the exterior thereof for locking or releasing said member rotationally with respect to said body, second detent means carried by said body and operable from the exterior thereof for holding or releasing axially said tool inserted in said member, and an external sleeve rotationally and slidably mounted on said body for operating said detent means to selectively lock or release said tool both rotationally and axially relative to said body, said sleeve being axially shiftable from a lower position in which both of said detent means are engaged to an upper position in which both of said detent means are released, and said sleeve including a portion extending below said body and positioned to be engaged and lifted by the uppermost of a series of work pieces accumulated on the shank of said tool by said holder to release said first detent means and thereby automatically break the driving connection between said body and said tool engaging member.

12. The combination, with a tool holder having a body adapted to be rotated and providing a tool guiding bore and a tool engaging member rotatably mounted in said body and providing tool driving surfaces and a second tool guiding bore aligned with and spaced from the first mentioned bore, of a rotary tool having a shank providing two axially aligned and spaced apart cylindrical portions adapted to engage and be guided in said bores, and driving surfaces located between said cylindrical portions.

13. The combination defined in claim 12, in which the first mentioned bore and the cooperating surface of the tool are of smaller diameter than the last mentioned bore and cooperating tool surface.

14. The combination defined in claim 13, in which the driving surfaces located between the two bores are formed by the flats provided by square cross sections.

15. The combination defined in claim 14, in which the distance across the flats is at least as great as the diameter of the first mentioned bore and the distance between the diagonal corners defined by the flats is less than the diameter of the second mentioned bore.

16. The combination defined in claim 12, in which said holder includes radially movable detent means carried by said body and one of the cylindrical portions of the shank of the tool is circumferentially grooved to be releasably engaged by said detent means.

17. A rotary tool having a working part and a cylindrical shank portion extending from said working part, a driving portion, square in cross section, adjacent to said cylindrical portion and a cylindrical pilot end portion having a V-shaped circumferential groove, adjacent to said driving portion, said pilot portion being of smaller diameter than said cylindrical portion and the distance across the flats of said square cross section being at least equal to the diameter of said pilot portion and less than the diameter of said cylindrical portion.

References Cited in the file of this patent

UNITED STATES PATENTS

| | | |
|---|---|---|
| Re. 13,724 | Lindberg | May 12, 1914 |
| 283,745 | Bartlett | Aug. 28, 1883 |
| 974,239 | Dalton | Nov. 1, 1910 |
| 1,105,553 | Edwards | July 28, 1914 |
| 1,133,795 | Edwards | Mar. 30, 1915 |
| 1,174,997 | Lackner | Mar. 14, 1916 |
| 2,320,360 | Grey | June 1, 1943 |

FOREIGN PATENTS

| | | |
|---|---|---|
| 159,069 | Great Britain | Feb. 24, 1921 |
| 555,056 | France | 1923 |